US011029399B2

(12) United States Patent
Han et al.

(10) Patent No.: US 11,029,399 B2
(45) Date of Patent: *Jun. 8, 2021

(54) SYSTEM AND METHOD FOR CALIBRATING LIGHT INTENSITY

(71) Applicant: Beijing Voyager Technology Co., Ltd., Beijing (CN)

(72) Inventors: Xufeng Han, Mountain View, CA (US); Tingbo Hou, Santa Clara, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 548 days.

This patent is subject to a terminal disclaimer.

(21) Appl. No.: 15/886,206

(22) Filed: Feb. 1, 2018

(65) Prior Publication Data

US 2019/0235063 A1   Aug. 1, 2019

(51) Int. Cl.
*G01C 3/08* (2006.01)
*G01S 7/497* (2006.01)
(Continued)

(52) U.S. Cl.
CPC .......... *G01S 7/4972* (2013.01); *G01C 21/005* (2013.01); *G01S 7/497* (2013.01); *G01S 17/42* (2013.01); *G01S 17/89* (2013.01)

(58) Field of Classification Search
CPC ....... G01C 21/005; G01C 21/00; G01S 7/497; G01S 17/42; G01S 7/4972; G01S 17/89
(Continued)

(56) References Cited

U.S. PATENT DOCUMENTS 9,425,654 B2    8/2016  Lenius et al.
9,519,060 B2   12/2016  Chidlovskii et al.
(Continued)

FOREIGN PATENT DOCUMENTS

CN    105745113 A    7/2016
CN    107430188 A   12/2017
(Continued)

OTHER PUBLICATIONS

Office Action dated Aug. 13, 2019, issued in related Taiwan Application No. 108104324, with English machine translation (7 pages).
(Continued)

*Primary Examiner* — Daniel L Murphy
(74) *Attorney, Agent, or Firm* — Sheppard Mullin Richter & Hampton LLP

(57) ABSTRACT

Systems and methods are provided for calibrating light intensity. An exemplary method for light intensity calibration may comprise: obtaining a plurality of intensity distributions of reflected light from an area, wherein each of the intensity distributions is associated with a beam; determining a reference intensity distribution from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam; and aligning each of the non-reference intensity distributions to the reference distribution to calibrate the non-reference intensity distributions against the reference distribution.

20 Claims, 9 Drawing Sheets

(51) Int. Cl.
*G01S 17/89* (2020.01)
*G01S 17/42* (2006.01)
*G01C 21/00* (2006.01)

(58) Field of Classification Search
USPC ...................................................... 356/4.07
See application file for complete search history.

(56) References Cited

U.S. PATENT DOCUMENTS

| | | | |
|---|---|---|---|
| 10,012,723 | B2 | 7/2018 | Lindskog et al. |
| 10,107,899 | B1 | 10/2018 | Han et al. |
| 10,168,429 | B2 | 1/2019 | Maleki et al. |
| 2014/0233010 | A1 | 8/2014 | Baldwin et al. |
| 2016/0231121 | A1 | 8/2016 | Young et al. |

FOREIGN PATENT DOCUMENTS

| | | |
|---|---|---|
| TW | 201643463 A | 12/2016 |
| TW | 201743076 A | 12/2017 |

OTHER PUBLICATIONS

International Search Report and the Written Opinion dated Nov. 29, 2018, issued in International Application No. PCT/US2018/057209 (7 pages).

Jutzi, Boris et al., "Normalization of Lidar Intensity Data Based on Range and Surface Incidence Angle," Proceedings of Laserscanning, Jan. 2009.

Kashani, Alireza G. et al., "A Review of LIDAR Radiometric Processing: From Ad Hoc Intensity Correction to Rigorous Radiometric Calibration," Sensors, Nov. 2015.

Levinson, Jesse et al., "Robust Vehicle Localization in Urban Environments Using Probabilistic Maps," IEEE International Conference on Robotics and Automation, May 2010.

Levinson, Jesse et al., "Unsupervised Calibration for Multi-beam Lasers," 12th International Symposium on Experimental Robotics, Dec. 2010.

Sakoe, Hiroaki et al., "Dynamic Programming Algorithm Optimization for Spoken Word Recognition," IEEE Transactions on Acoustics, Speech, and Signal Processing, vol. ASSP-26, No. 1, Feb. 1978.

Ted, Tee-Ann et al., "Empirical Radiometric Normalization of Road Points from Terrestrial Mobile Lidar System," Remote Sensing, May 2015.

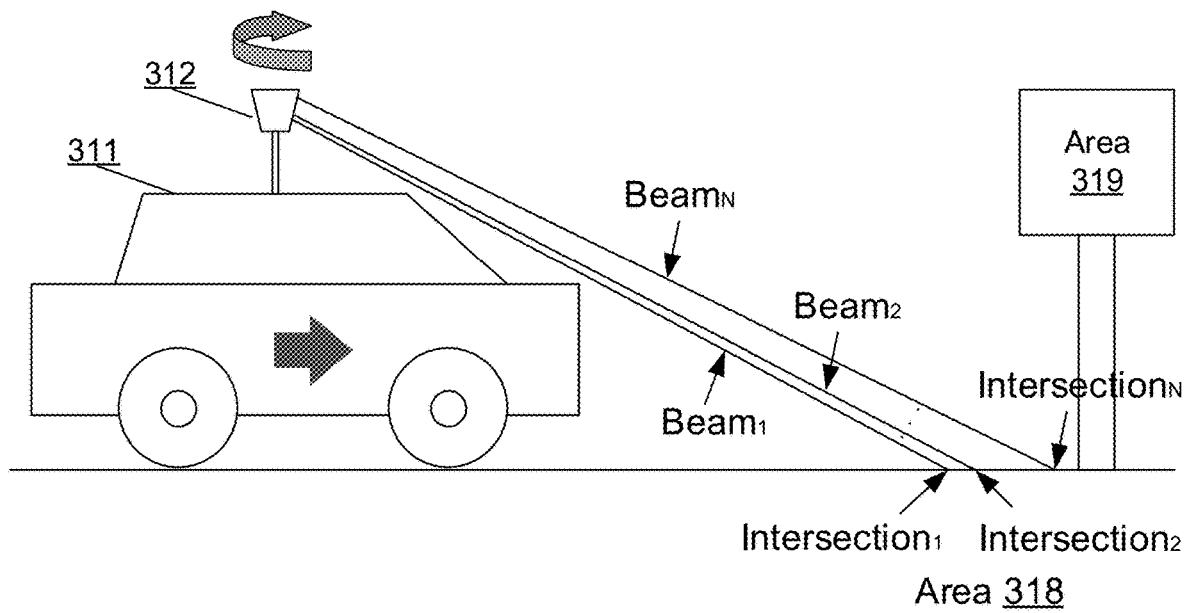
FIGURE 3A (side view)
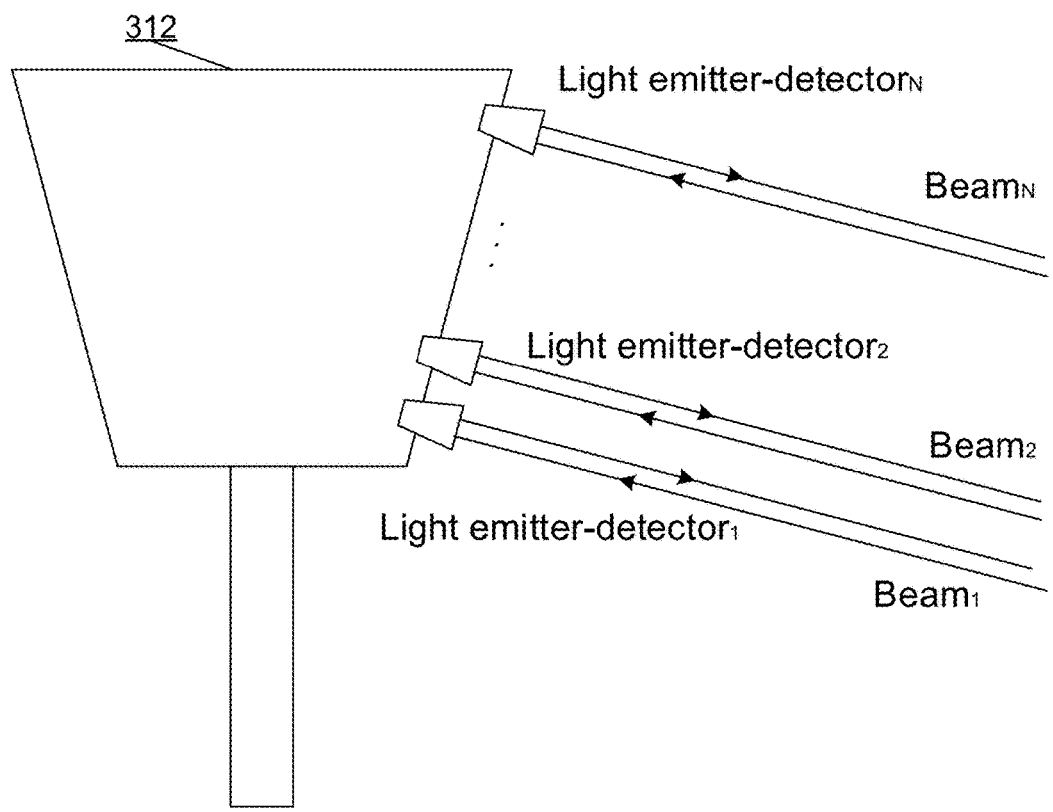
FIGURE 3B (side view)

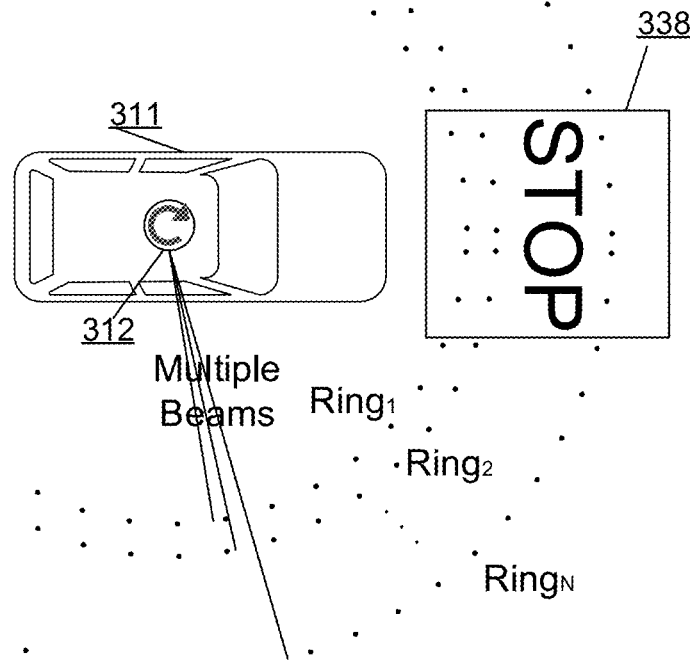
FIGURE 3C (top view)
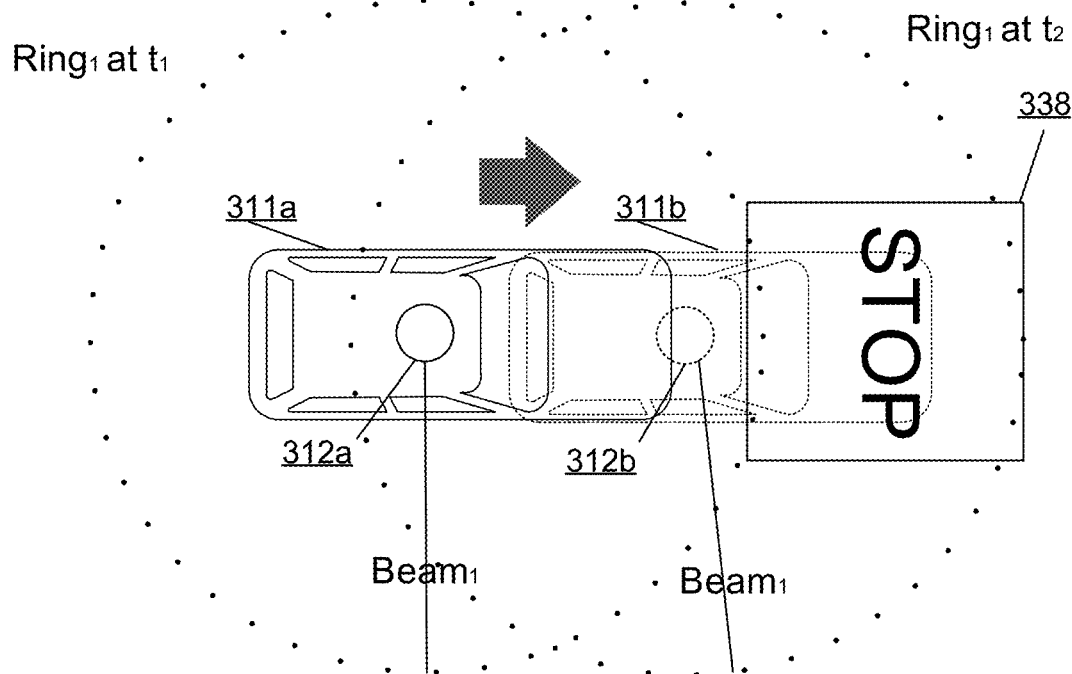
FIGURE 3D (top view)

Intensity mapping for each Beam

Raw intensity output    Calibrated intensity ouput

SYSTEM AND METHOD FOR CALIBRATING LIGHT INTENSITY

TECHNICAL FIELD

This disclosure generally relates to methods and devices for light intensity calibration, and in particular, to methods and devices for LIDAR (Light Detection And Ranging) intensity calibration.

BACKGROUND

Sensor devices have been widely used for detection and ranging. One critical step for ensuring accurate performances is calibration. Through calibration, erroneous intensity readings can be corrected to a standard level.

SUMMARY

Various embodiments of the present disclosure can include systems, methods, and non-transitory computer readable media for light intensity calibration. According to one aspect, an exemplary method for light intensity calibration may comprise obtaining a plurality of intensity distributions of reflected light from an area, wherein each of the intensity distributions is associated with a beam; determining a reference intensity distribution from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam; and aligning each of the non-reference intensity distributions to the reference distribution to calibrate the non-reference intensity distributions against the reference distribution. In some embodiments, the method may further comprise obtaining an intensity mapping that maps any raw non-reference beam intensity reading to a calibrated intensity reading.

In some embodiments, aligning each of the non-reference intensity distributions to the reference distribution may comprise applying a Dynamic Time Warping (DTW) algorithm to align each of the non-reference intensity distributions to the reference distribution.

In some embodiments, a LIDAR device may comprise N rotatable light emitters and detectors mountable on a movable vehicle, the each light emitter emitting the each beam and the each light detector detecting the each corresponding light intensity while in rotation as the vehicle moves relative to the area. The beams may be Beams 1, 2, ... i−1, i, i+1, i+2, ..., and i+(N−i) in an order based on a physical proximity among intersections of the beams with the area at the same time, i being any number from 1 to N. The reference beam may be $Beam_i$. Aligning each of the non-reference intensity distributions to the reference distribution may comprise, for the intensity distributions, recursively aligning the each non-reference beam to a physically closest beam towards the reference beam until aligning to the reference beam.

In some embodiments, for the intensity distributions, recursively aligning the each non-reference beam to the physically closest beam towards the reference beam may comprise aligning $Beam_{i+1}$ to $Beam_i$ and $Beam_{i-1}$ to $Beam_i$; aligning $Beam_{i+2}$ to $Beam_{i+1}$ and $Beam_{i-2}$ to $Beams_{i-1}$; repeating the alignments until each of the non-reference beams is aligned to another beam towards the reference beam; and propagating the alignments throughout the non-reference beams to align each of the non-reference beams to the reference beam.

In some embodiments, the physical proximity among the intersections of the beams with the area may correspond to another physical proximity among the light emitters on the LIDAR device.

In some embodiments, the light beams may be respectively emitted from a plurality of light emitters of a LIDAR device. The LIDAR device may further comprise a plurality of light detectors for respectively receiving the reflected light. In association with the each beam, the each light emitter and associated light detector may be movable relative to the area and configured to obtain an intensity reading at various time points to obtain the corresponding intensity distribution over the area.

In some embodiments, the LIDAR device may be disposed on a vehicle. The each light emitter and associated light detector may be configured to rotate relative to the vehicle as the vehicle moves relative to the area. In association with the each beam, the each intensity distribution over the area may comprise a plurality of the intensity readings caused by the rotation and the vehicle movement.

In some embodiments, each of the intensity distributions may be representable in a histogram associating an light intensity reading and a frequency of occurrence of the light intensity reading in the area. The area may comprise a marker corresponding to one or more intensity peaks in one or more histograms of the intensity distributions. The reference intensity distribution may be representative of the marker in a background.

According to another aspect, a system for light intensity calibration may comprise a processor configured to obtain a plurality of intensity distributions of reflected light from an area, wherein each of the intensity distributions is associated with a beam; determine a reference intensity distribution from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam; and align each of the non-reference intensity distributions to the reference distribution to calibrate the non-reference intensity distributions against the reference distribution.

According to yet another aspect, the present disclosure provides a non-transitory computer-readable storage medium coupled to a processor and comprising instructions that, when executed by the processor, cause the processor to perform a method for light intensity calibration. The method may comprise obtaining a plurality of intensity distributions of reflected light from an area, wherein each of the intensity distributions is associated with a beam; determining a reference intensity distribution from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam; and aligning each of the non-reference intensity distributions to the reference distribution to calibrate the non-reference intensity distributions against the reference distribution.

According to yet another aspect, a system for light intensity calibration, implementable on a LIDAR (Light Detection And Ranging) device, the system may comprise a plurality of rotatable light emitters and detectors mountable on a movable vehicle and a processor coupled to the detectors. The each light emitter may emit a beam and the each light detector may detect a reflection of the corresponding beam while in rotation as the vehicle moves relative to an area. The processor may be configured to: obtain a plurality of intensity distributions of the reflected light from the area; determine a reference intensity distribution from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam; and align each of the non-reference intensity distributions to the reference distribution to calibrate the non-reference intensity distributions against the reference distribution.

In some embodiments, to align the non-reference intensity distribution to the reference distribution, the processor is configured to recursively align the non-reference intensity distribution to a neighboring non-reference intensity distribution towards the reference intensity distribution until aligned with the reference intensity distribution. The plurality of light emitters and detectors may comprise N pairs of light emitters and detectors associated with N emitted beams and N reflections of the emitted beams. The N beams may be Beams 1, 2, . . . i−1, i, i+1, i+2, . . . , and i+(N−1) in an order based on a physical proximity, i being any number from 1 to N, and the reference beam being Beam$_i$. In one example, the physical proximity may be based on intersections of the beams with the area at the same time. In another example, the physical proximity may be based on emitters or detectors of the beams on the system.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3A illustrates an exemplary system for LIDAR intensity calibration, in accordance with various embodiments.

FIG. 3B illustrates an exemplary LIDAR system, in accordance with various embodiments.

FIG. 3C illustrates exemplary intensity spots for multiple rotating and stationary beams, in accordance with various embodiments.

FIG. 3D illustrates exemplary intensity spots for a rotating and moving beam, in accordance with various embodiments.

DETAILED DESCRIPTION

Multiple-beam LIDARs are critical sensors responsible for localization, mapping, and various other functions of autonomous vehicles. An exemplary LIDAR system may comprise multiple sets of light emitters (e.g., lasers) and light detectors, each set configured to emit a beam towards a distant object and receive reflected light signals. Based on the received signals, the LIDAR can obtain (x, y, z) coordinates and intensity values corresponding to the distant object.

In some implementations, the distant object may comprise traffic signs or other important information, and accurate LIDAR detection is essential for correctly recognizing such information. To that end, the intensity values need to be calibrated across the beams. For example, calibrated beams should correctly give the same intensity reading on the same target (e.g., a part of road surface). In current technologies, one approach to the problem divides the target space into small "cells," and for any beam r that returns value i on cell p, uses the consensus of other beams in p as an estimation. This existing method relies significantly on accurate pose estimations of the LIDAR in order to register detection points from multiple beams correctly into the same cell.

The disclosed method obviates the requirement for accurate pose estimation by aligning intensity distribution over a much larger area (e.g., on the order of hundreds of meters) where all the beams share a significant overlap, while achieving an accurate calibration. The disclosed methods are also unsupervised and convenient for implementation.

Figure 1:
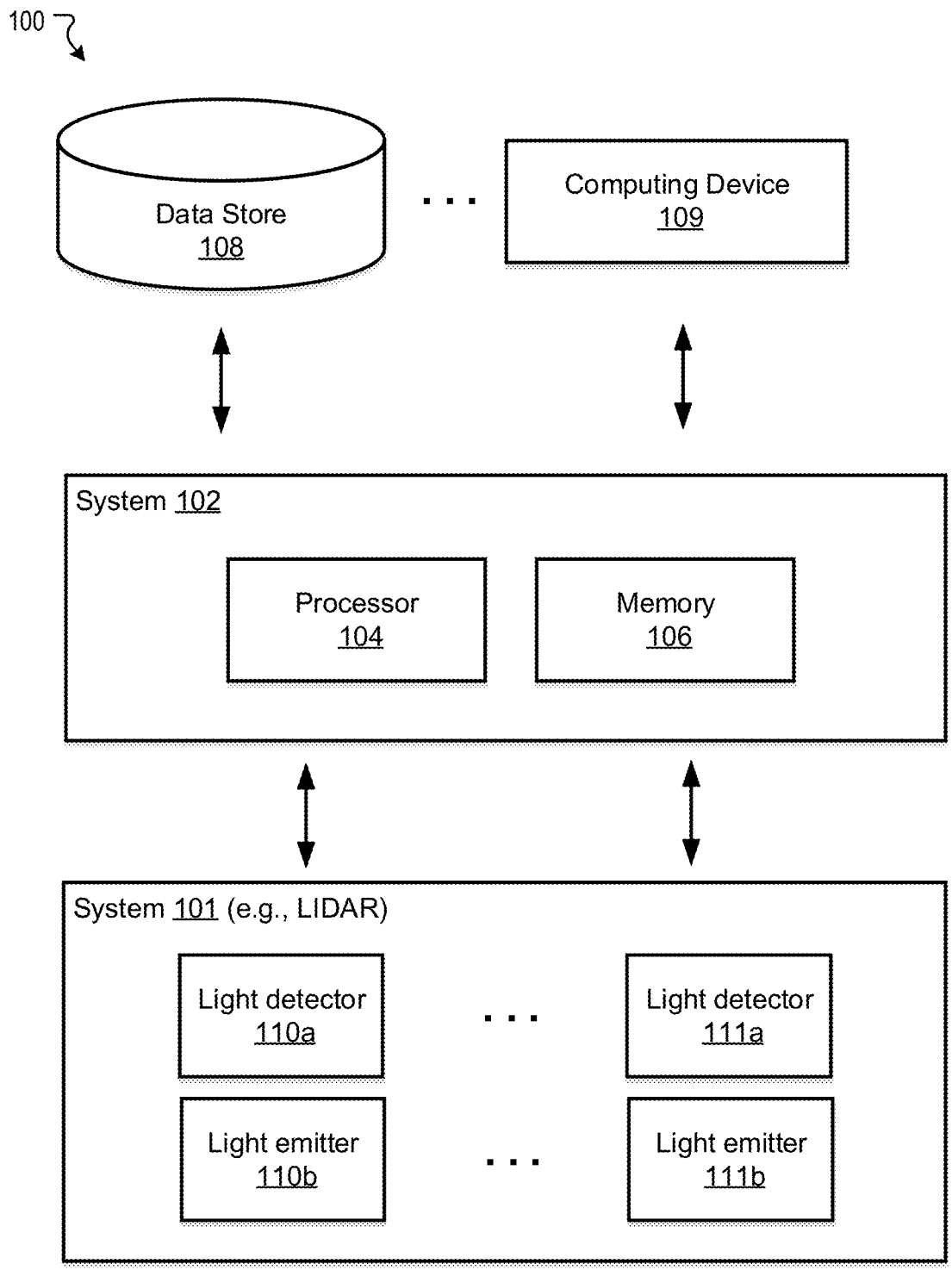
FIG. 1 illustrates an exemplary system for light intensity calibration, in accordance with various embodiments.

FIG. 1 illustrates an exemplary system 100 for light intensity calibration, in accordance with various embodiments. As shown in FIG. 1, the exemplary system 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as a mobile phone, a tablet, a server, a computer, a wearable device (smart watch), etc. The system 102 may be installed with appropriate software (e.g., data transfer program, etc.) and/or hardware (e.g., wire connections, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data (e.g., location, time, moving speed, acceleration, map) from the data store 108 (e.g., a cloud database) and/or the computing device 109 (e.g., a server, a mobile phone, a vehicle computer).

The system 100 may further include a system 101 (e.g., a LIDAR system) coupled to the system 102. The system 101 may comprise one or more light detectors (e.g., light detectors 110a, 111a, etc.) and one or more light emitters (e.g., light emitters 110b, 111b, etc.). The light emitters and detectors (e.g., 64-channel infrared laser and detector) may form emitter-detector pairs. Alternatively, one emitter may correspond to multiple detectors and vice versa. In some embodiments, the system 102 (e.g., the processor 104) may be configured to obtain data (e.g., intensity readings, 3D locations of the reflection spots, time points of the intensity readings) from the one or more light detectors, and perform various light intensity calibration methods and steps described herein. Each intensity reading may correspond to a beam and a light emitter that emitted the beam. The calibration method may yield an intensity mapping for each detector-emitter pair detection beam to map any raw intensity reading from this beam to a calibrated intensity reading.

In some embodiments, the system 102 and the one or more of the computing devices (e.g., the computing device 109) may be integrated in a single device or system. Alternatively, the system 102 and the one or more computing devices may operate as separate devices. The one or more data store (e.g., the data store 108) may be anywhere accessible to the system 102, for example, in the memory 106, in the computing device 109, in another device (e.g., network storage device) coupled to the system 102, or another storage location (e.g., cloud-based storage system, network file system, etc.), etc. The system 102 may be implemented as a single system or multiple systems coupled to each other. In general, the system 102, the computing device 109, the data store 108, and the system 101 may be able to communicate with one another through one or more wired or wireless networks (e.g., the Internet) through which data can be communicated.

Figure 2:
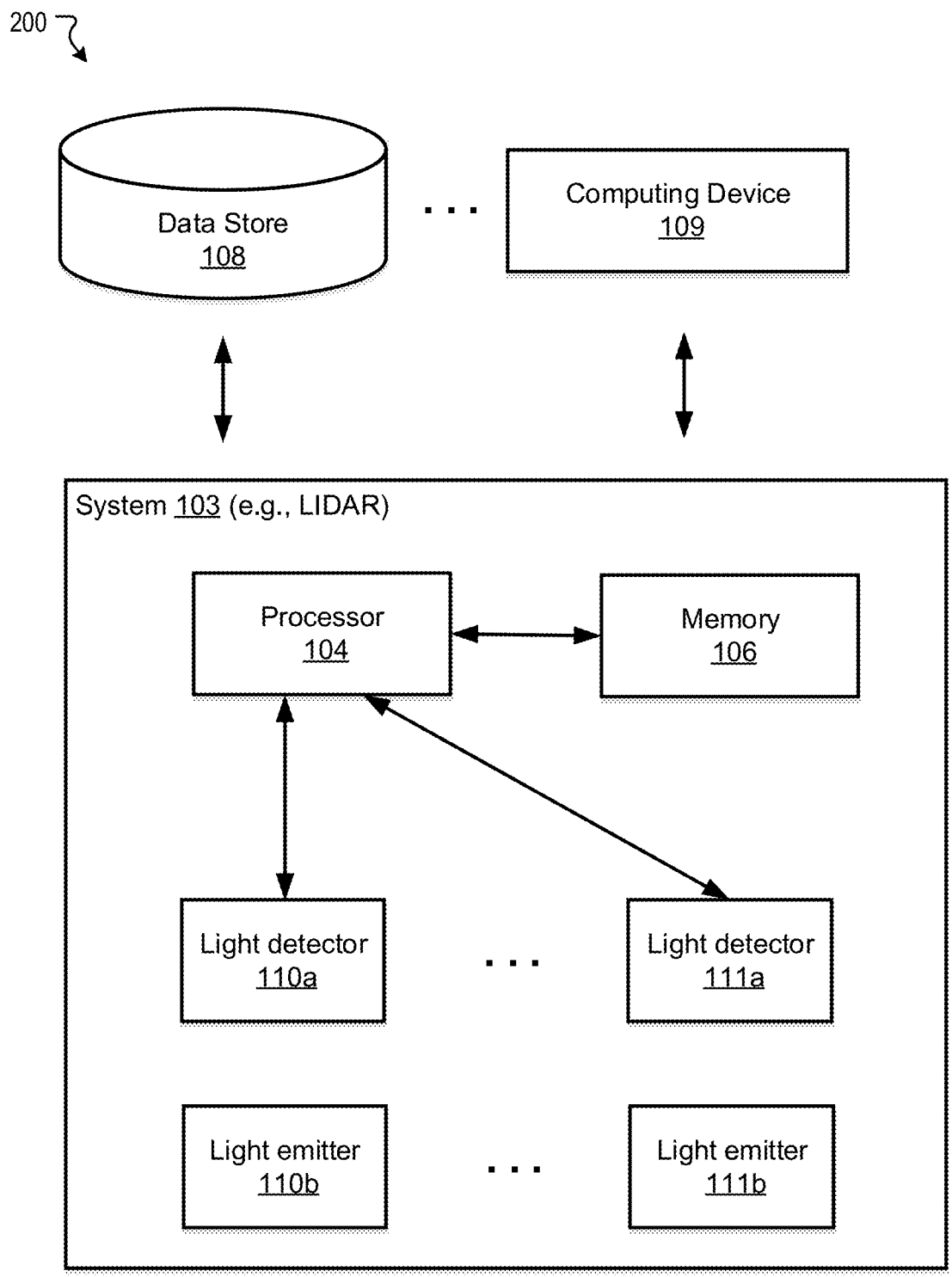
FIG. 2 illustrates another exemplary system for light intensity calibration, in accordance with various embodiments.

FIG. 2 illustrates an exemplary system 200 for light intensity calibration, in accordance with various embodiments. The operations shown in FIG. 2 and presented below are intended to be illustrative. The system 200 is similar to the system 100 described above, except that the system 102 and the system 101 illustrated in FIG. 1 are merged to obtain the system 103 in FIG. 2. The system 103 may be implemented as a LIDAR system. The system 103 may comprise a processor 104, a memory 106, one or more light detectors (e.g., 110a, 111a, etc.), and one or more light emitters (e.g., 110b, 111b, etc.), each configured to perform steps similar to those described above with reference to FIG. 1. The data store 108 and the computing device 109 may be coupled or integrated to the system 103. Various aspects of the system 100 and the system 200 are described below in reference to FIG. 3A to FIG. 5.

FIG. 3A illustrates an exemplary system for LIDAR intensity calibration, in accordance with various embodiments. The operations shown in FIG. 3A and presented below are intended to be illustrative. As shown in the side view of FIG. 3A, a system 312 may be disposed on a vehicle 311 (e.g., car, taxi, internet-based service vehicle, motorcycle, bus, boat, drone, etc.). The system 312 may comprise the system 101 or the system 103 described above. If the system 312 comprises the system 101, the system 102 may be disposed also in the system 312, disposed in the vehicle 311, or remotely (e.g., wirelessly) coupled to the system 312. The vehicle 311 may be, but not necessarily, autonomous. That is, the vehicle 311 may be capable of navigating without a human driver. The vehicle 311 may be configured to move around similar to regular cars. The driverless navigation may be achieved at least based in part on the sensing output by the system 312. The system 312 may be configured to rotate (e.g., with respect to an axis vertical to the vehicle 311).

In various embodiments, the system 312 may emit one or more beams (e.g., $Beam_N$ to $Beam_1$ from various light emitters) towards a distant target and correspondingly detect the reflected beams. The emitted beams may touch upon and reflect off any target, such as a distant area 318 on the ground, an area 319 on an erected board, etc. For example, $Beam_1$ may reflect off the area 318 at $Intersection_1$, $Beam_2$ may reflect off the area 318 at $Intersection_2$, and $Beam_N$ may reflect off the area 318 at $Intersection_N$. The physical proximity between the intersections may correspond to the physical proximity between the beams. For example, $Intersection_1$ is closer to $Intersection_2$ than $Intersection_N$, which corresponds to the closer proximity between $Beam_1$ and $Beam_2$. Further, the area scanned by the beams may comprise one or more signs, markings, labels, or the equivalents that carry information (e.g., traffic signs, map information). By the scan, intensity readings off the spots on the signs and the surrounding background can be obtained, and intensity differences can be used to extract the carried information.

FIG. 3B illustrates an exemplary LIDAR system, in accordance with various embodiments. The operations shown in FIG. 3B and presented below are intended to be illustrative. FIG. 3B illustrates further details of the system 312 according to some embodiments in side view. The system 312 may comprise multiple light emitters and light detectors configured to detect reflections from multiple beams at the same time. In some embodiments, the light emitters and detectors may be paired (e.g., light emitter-$detector_1$ to light emitter-detectors), each emitting an outgoing beam and receiving an incoming beam as a reflection of the outgoing beam. Although in this figure a light emitter and light detector pair is shown as an integrated component, an independent light emitter and an independent light detector can be disposed as separate components and pairing for detection. Further, one emitter may be detected by multiple detectors, and one detector may detect multiple reflections from multiple beams. As shown in this figure, the physical proximity between the beams may correspond to the physical proximity between the corresponding light emitter-detectors on the system 312. For example, the light emitter-detector pairs may be arranged on a side surface from top to bottom (from N to 1) facing towards a distant ground. Thus, in view of FIG. 3A and FIG. 3B, the physical proximity among the intersections of the beams with the area 318 may correspond to another physical proximity among the light emitters on the LIDAR device.

FIG. 3C illustrates exemplary intensity spots for multiple rotating and stationary beams, in accordance with various embodiments. The operations shown in FIG. 3C and presented below are intended to be illustrative. In the top view of the FIG. 3C, the vehicle 311 is relatively stationary to a distant area 338 on the ground, which comprises a "stop" sign. In some embodiments, the system 312 may be configured to rotate with respect to the vehicle 311, while the light emitter-detector pairs respectively emit light and capture reflected light intensities. By the rotation, each light beam facing the ground scans a circumference of a circle centered at the system 312 (e.g., $Ring_1$ to $Ring_N$). Since the light emitters may be pulsed lasers, intensities of reflections from various spots along the circumference are measured. By increasing the spot density, reflections off nearly the entire circumference can be measured. Further, the light emitter-detectors can be positioned at various angles with respect to the system 312 such that reflection spots at various distances from the vehicle 311 can be measured. For example, in this figure, $Ring_1$ comprises reflection spots closer to the vehicle 311 than $Ring_N$. The distances among the rings can be adjusted.

FIG. 3D illustrates exemplary intensity spots for a rotating and moving beam, in accordance with various embodiments. The operations shown in FIG. 3D and presented below are intended to be illustrative. In the top view of the FIG. 3D, the vehicle 311 may move relatively to (e.g., towards) the distant area 338. Although multiple beams may be emitted simultaneously from the system 312 to detect their reflected intensities, only one beam is shown in this figure to keep the illustration clean. Here, the system 312 may be configured to perform the scan described above with reference to FIG. 3C continuously as the vehicle 311 moves towards the area 338 (e.g., from vehicle 311a and system 312a at time $t_1$ to vehicle 311b and system 312b at time $t_2$). At time $t_1$, an exemplary $Beam_1$ may rotate and yield $Ring_1$ of $t_1$, a part of which barely enters a closer edge of the area 338. At time $t_2$, the same $Beam_1$ may rotate and yield $Ring_1$ of $t_2$, a part of which is leaving a further edge of the area 338. Between the time $t_1$ and $t_2$ (not shown here), the $Beam_1$ may have been continuously scanning, and some of the detected intensity are reflected off spots across the entire area 338. Similar scanning and intensity detections can be obtained from other beams of the system 312.

In some embodiments, as shown above, the scanning across the area 338 can be enabled by the rotation and movement of the vehicle. The light beams may be fixed to the vehicle 311 except for the rotation. Nevertheless, there can be many other mechanisms for alternatively achieving the scanning across the area. In various examples, the light emitters may be configured to move translationally relative to the vehicle, the light emitters may be configured to rotate in a plane vertical to the vehicle, the emitters may comprise optics configured to tune the angle of the emitted beam relative to vehicle, etc.

Figure 3E:
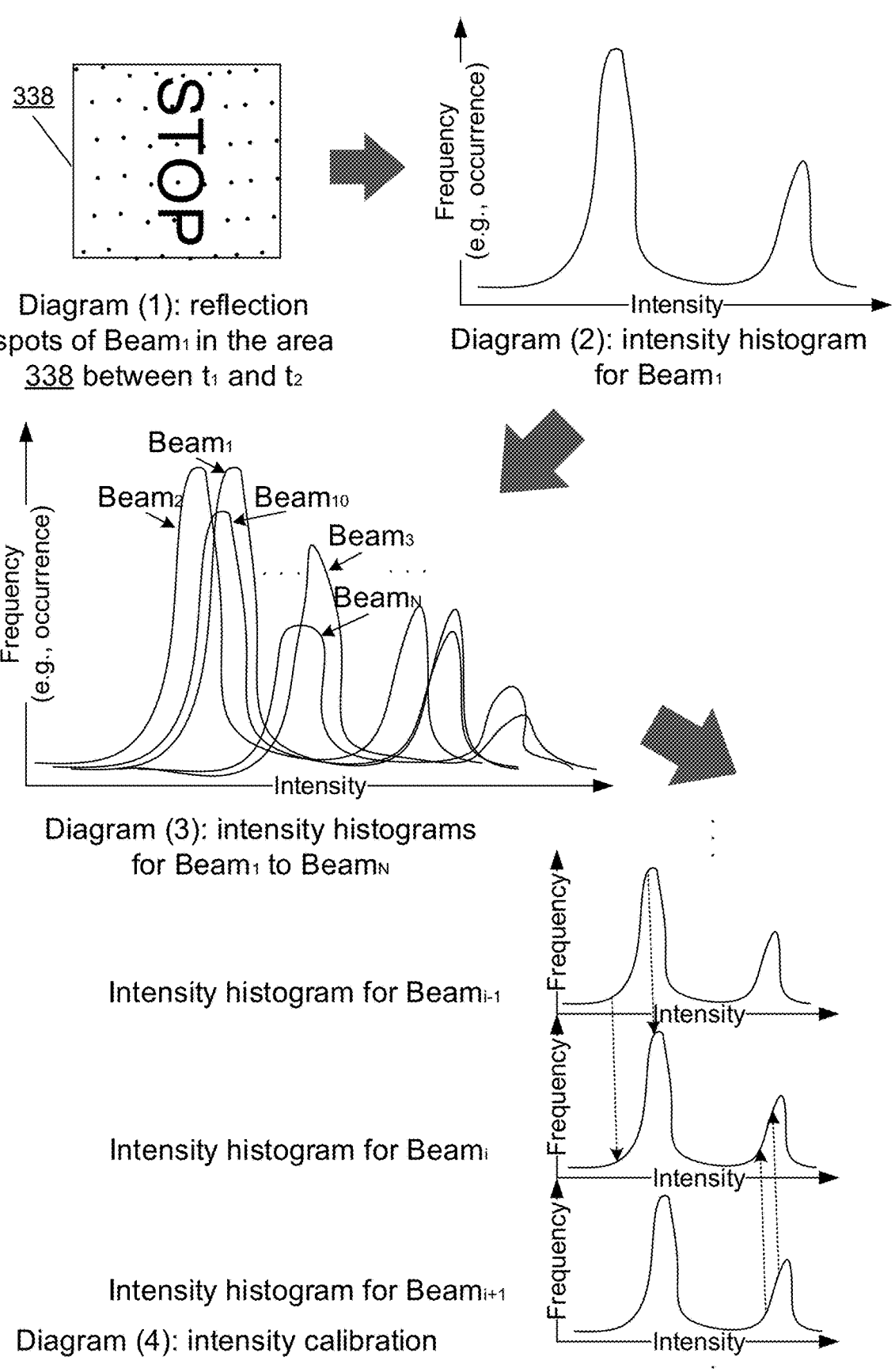
FIG. 3E illustrates exemplary intensity distributions and calibration, in accordance with various embodiments.

FIG. 3E illustrates exemplary intensity distributions and calibration, in accordance with various embodiments. The operations shown in FIG. 3E and presented below are intended to be illustrative. Continuing from FIG. 3D, reflection spots of $Beam_1$ in the area 338 may be aggregated between $t_1$ and $t_2$ as the system 312 rotates and the vehicle 311 advances. The aggregated spot distribution for $Beam_1$ in the area 338 is shown in Diagram (1) of FIG. 3E. As discussed above, since each intensity measurement may be associated with a time of the measurement and/or a 3D-location of the reflection spot, reflection spots that fall in a certain area (e.g., the area 338 or some designated portion of the area 338) may be determined based on the 3D-locations and a boundary of the area, or based on the time stamps (e.g., $t_1$ and $t_2$). In practice, the reflection spots can be much denser over an area to increase accuracy.

Once the reflection spots within the area 338 are determined, as shown in Diagram (2) of FIG. 3E, an intensity distribution can be obtained for Beam1. The intensity distribution can be represented, for example, by a histogram with the intensity on the x-axis and the frequency on the y-axis (here the histogram is smoothed to a curve). That is, each of the intensity distributions may be representable in a histogram associating a light intensity reading and a frequency of occurrence of the light intensity reading in the area. The intensity axis may, for example, correspond to a pixel detection range from 0 (black) to 255 (white). The area 338 may comprise a marker (e.g., the "stop") corresponding to one or more intensity peaks in one or more histograms of the intensity distributions. In one exemplary embodiment, the reference intensity distribution may be representative of the area, with some of the intensity peaks representing reflections off the marker and some other intensity peaks representing reflections off the surrounding background. For example, the reflection intensities off the "stop" sign may correspond to the left peak, and reflection intensities off the surrounding background of the "stop" sign may correspond to the right peak.

Similarly, as shown in Diagram (3) of FIG. 3E, intensity distributions for all beams from $Beam_1$ to $Beam_N$ can be obtained. That is, a plurality of intensity distributions of reflected light from the area 338 can be obtained, wherein each of the intensity distributions is associated with a beam. As shown in this diagram, points along the histograms of various beams may be deformed relative to each other, even though the reflection spots for each beam covering the same area 338 are supposed to yield similar intensity histograms. The deformation may or may not be uniform. That is, the deformation may appear random across the histograms. A relative deformation between two neighboring histograms may comprise shifting in the x and/or y directions, stretching or squeezing, mismatch in peak heights, or any other deformation obtained by the device measurement. In various embodiments, the histograms of beams may be more complicated than those shown in the figure, and the histograms may have larger differences. For example, the shifts from $Beam_1$ to $Beam_N$ may appear random. $Beam_2$ may appear shifted left from $Beam_1$, $Beam_3$ may appear shifted right from $Beam_2$, and $Beam_3$ may have one peak (e.g., its right peak) missing (e.g., below a threshold such that it is noticeable). The corresponding peaks in the histograms may have different scalers in one direction (e.g., from $Beam_i$ to $Beam_1$, from $Beam_i$ to $Beam_N$). As such, the calibration may be non-linear. Thus, each of these intensity distributions need to be calibrated such that the intensity measurements of different beams across the same area yield similar (e.g., completely overlapping) intensity distributions. For clearer illustration, the following Diagram (4) of FIG. 3E may only show shifted histograms as an example.

With reference to Diagram (4) of FIG. 3E, a reference intensity distribution can be determined from the plurality of intensity distributions, wherein the reference intensity distribution is associated with a reference beam, the plurality of intensity distributions excluding the reference intensity distribution are non-reference intensity distributions, and the non-reference intensity distributions are each associated with a non-reference beam. Each of the non-reference intensity distributions can be aligned to the reference distribution to calibrate the non-reference intensity distributions against the reference distribution. There can be many ways to determine the reference intensity distribution. For example, if the area consists of a uniform sign with a uniform background, the reference intensity distribution should comprise two non-overlapping peaks representing reflected intensities off the two distinct regions, and an intensity distribution having such well-positioned characteristics can be determined as the reference intensity distribution. Exemplary rules such as peak separation thresholding, peak value range thresholding, and peak height thresholding can be applied to make such determination. For another example, if a predetermined intensity distribution or statistics of a predetermined intensity distribution for the same area is accessible to the system 312 (e.g., stored in the system 312 or remotely available), the intensity distribution may be determined as the reference intensity distribution. Exemplary rules such as the least-mean-square difference can be applied to make such determination.

In some embodiments, as described above, the system 312 (e.g., a LIDAR device) may comprise N rotatable light emitters and detectors mountable on a movable vehicle, the each light emitter emitting the each beam and the each light detector detecting the each corresponding light intensity, while the emitters and detectors are in rotation and the vehicle moves relative to the area. The beams may be Beams 1, 2, . . . i−1, i, i+1, i+2, . . . , and i+(N−i) in an order based on a physical proximity (e.g., a physical proximity among intersections of the beams with the area at the same time, a physical proximity among the emitted beams in the air, a physical proximity among the emitted beams in the air, a physical proximity among the reflected beams in the air, a physical proximity among the emitters on the LIDAR, a physical proximity among the detectors on the LIDAR, etc.), i being any number from 1 to N. The reference beam may be beam i.

For example, referring to FIG. 3C, $Ring_1$ is closer to $Ring_2$ than $Ring_N$. Referring back to FIG. 3E, in some embodiments, aligning each of the non-reference intensity distributions to the reference distribution may comprise, for the intensity distributions, recursively aligning the each non-reference beam to a physically closest beam towards the reference beam until aligning to the reference beam. Here, the alignment of beams may refer to the alignment of the intensity distributions corresponding to the beams. For example, as shown in Diagram (4) of FIG. 3E, $Beam_{i+1}$ may be aligned to $Beam_i$, and $Beam_{i-1}$ may be aligned to $Beam_i$. For example, a Dynamic Time Warping (DTW) algorithm can be applied to align the intensity distributions. Some of the mapping relations are shown as dash arrows in Diagram (4). The DTW algorithm can calculate an optimal match between two given sequences (e.g., in a time series). The sequences are "warped" non-linearly in one dimension to determine a measure of their similarity independent of certain non-linear variations in the dimension. Notwithstanding, a person of ordinary skill in the art should appreciate that various other alternative methods or algorithms can be applied to align the intensity distributions.

Further, $Beam_{i+2}$ may be aligned to $Beam_{i+1}$, and $Beam_{i-2}$ may be aligned to $Beams_{i-1}$. The alignments may be repeated until each of the non-reference beams is aligned to another beam towards the reference beam (e.g., a next beam towards the reference beam). Further, the alignments can be propagated throughout the non-reference beams to align each of the non-reference beams to the reference beam. For example, given that $Beam_{i+1}$ has been aligned to $Beam_i$ and that $Beam_{i+2}$ has been aligned to $Beam_{i+1}$, the propagation can pass the alignment of $Beam_{i+1}$ to $Beam_{i+2}$, such that $Beam_{i+2}$ is aligned to $Beam_i$. Similarly, any alignment of a non-reference beam can be passed on and used in aligning one or more other non-reference beams further away from the reference beam. Aligning neighboring beams and propagating the alignment can help increase the alignment accuracy and decrease the computation power consumption, because neighboring beams cover closer areas (due to the physical proximity described above) and deviations between the neighboring beams are smaller than those between the non-neighboring beams. Thus, by one alignment for the each non-reference beam and the propagation, all non-reference beams can be aligned to the reference beam. And by aligning all non-reference intensity distributions, any value on a non-reference histogram can be mapped to a value (e.g., a calibrated value) on the reference histogram.

In some embodiments, corresponding transformation steps can be generalized according to the alignment described above. For example, for $Beam_{i-1}$ (a non-reference beam) and $Beam_i$ (a reference beam), alignment function W(k; i−1 to i) can be obtained for $Beam_{i-1}$ which converts $Beam_{i-1}$'s raw intensity with a peak value at frequency k to intensity W(k; i−1 to i) in alignment with Beam i. In one example, $Beam_{15}$ is a reference beam, and its intensity distribution is a reference to which the intensity distributions of other beams are to be aligned. If a frequency value of a peak in $Beam_{15}$ is 100, and $Beam_{14}$ has a similar peak around a similar intensity value with a frequency value k of 90, alignment function W(90; 14 to 15) would yield a calibrated intensity of 100 for the peak in $Beam_{14}$. A similar alignment function W(k; i+1 to i) can be used for beams higher in number than the reference beam. For example, if a frequency value of a peak in $Beam_{15}$ is 100, and $Beam_{16}$ has a similar peak around a similar intensity value with a frequency value k of 110, the alignment function W(110; 16 to 15) would yield an calibrated intensity of 100 for the peak in $Beam_{16}$.

Further, in the calibration propagation step, the global calibration function can be obtained by iterating the alignment function over all intermediate beams. Continuing the example of alignment function W(90; 14 to 15) described above, to align a similar peak in $Beam_{13}$, the alignment function is W(k; 13 to 15). This calibration comprises iterations of the alignment over $Beam_{14}$ and $Beam_{15}$, that is, W(k; 13 to 15)=W(k; 13 to 14) in combination with W(k; 14 to 15). Thus, W(k; 13 to 15) can be obtained from W(W(k; 13 to 14); 14 to 15). Similarly, any of the non-reference beam's intensity value can be calibrated by iterating the k value over intermediate beams between the target bream and the reference beam.

Figure 3F:
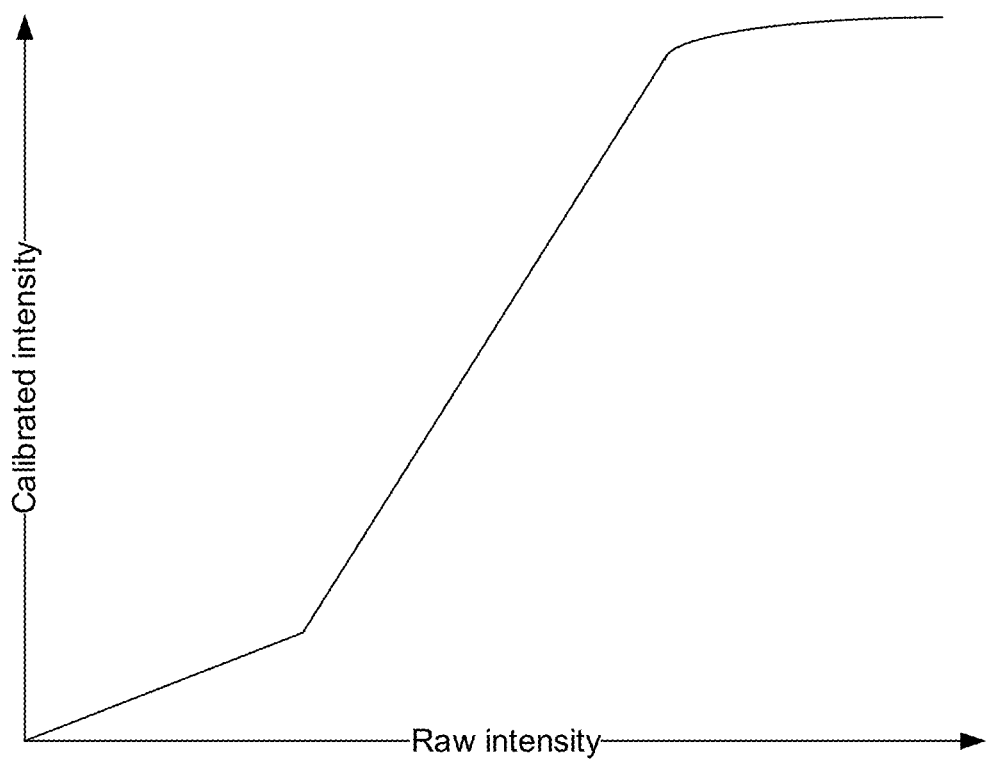
FIG. 3F illustrates an exemplary intensity mapping, in accordance with various embodiments.

FIG. 3F illustrates an exemplary intensity mapping, in accordance with various embodiments. The operations shown in FIG. 3F and presented below are intended to be illustrative. Continuing from FIG. 3E, an intensity mapping that maps any raw non-reference beam intensity reading to a calibrated intensity reading can be obtained based on the intensity distribution alignment for each non-reference beam. For each non-reference beam, various intensity values may correspond to the same or different alignment functions. In FIG. 3F, three exemplary alignment functions are plotted for three raw intensity ranges. Once this mapping is obtained, any future raw intensity reading on the x-axis can be mapped to a calibrated intensity reading on the y-axis. Although in this figure the intensity mapping is shown as a 2D plot, various other intensity mapping representations can be alternatively used.

Figure 3G:
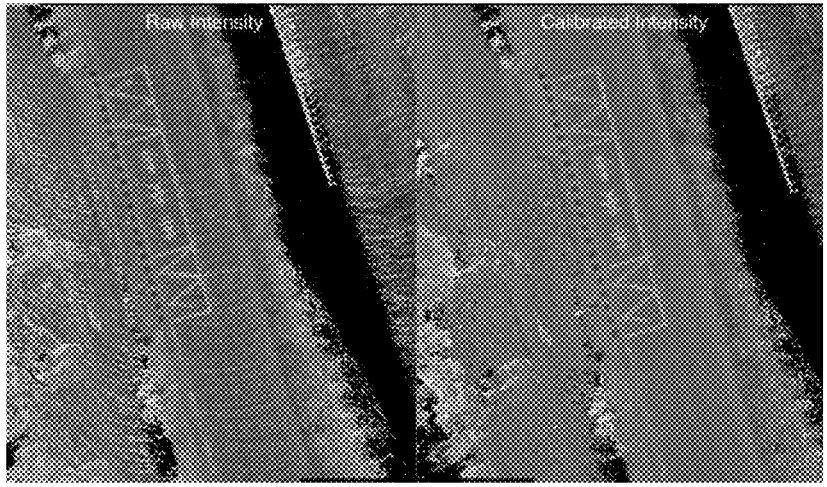
FIG. 3G illustrates three exemplary sets of raw intensity output and calibrated intensity output comparisons, in accordance with various embodiments.
Figure 3G:
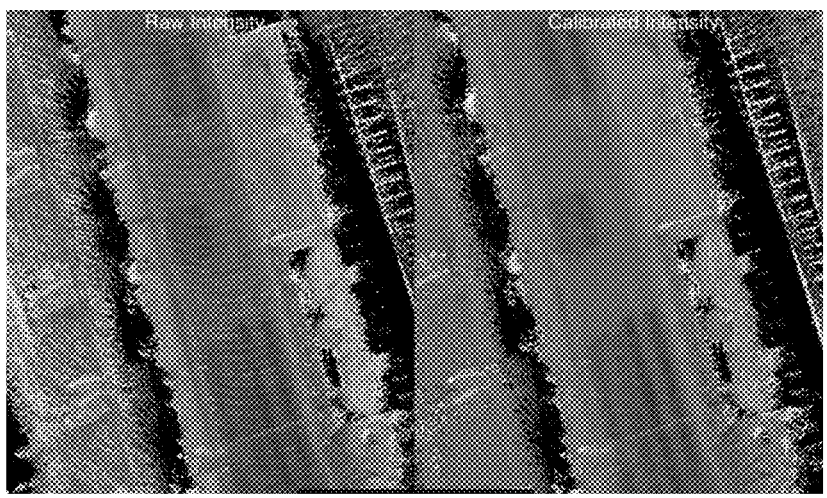
Figure 3G:
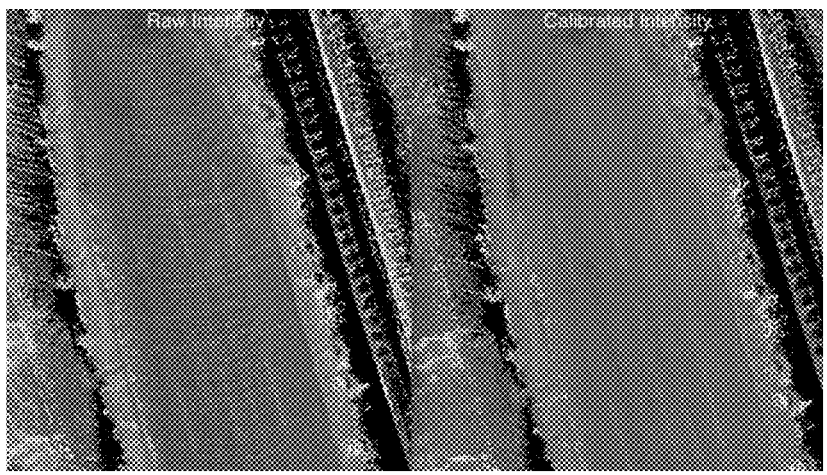

FIG. 3G illustrates three exemplary sets of raw intensity output and calibrated intensity output comparisons, in accordance with various embodiments. The operations shown in FIG. 3G and presented below are intended to be illustrative. The left image of each set shows the raw intensity output without applying the disclosed methods, and the right image of each set shows the corresponding intensity output after applying the disclosed methods. The intensity outputs in the right images all have shown greater clearness, smoothness, and accuracy at least with respect to road imagery (e.g., lane marker, direction, sign) represented as white lines. Thus, the disclosed systems and methods can be used to calibrate LIDARs for better performance on roads.

Figure 4:
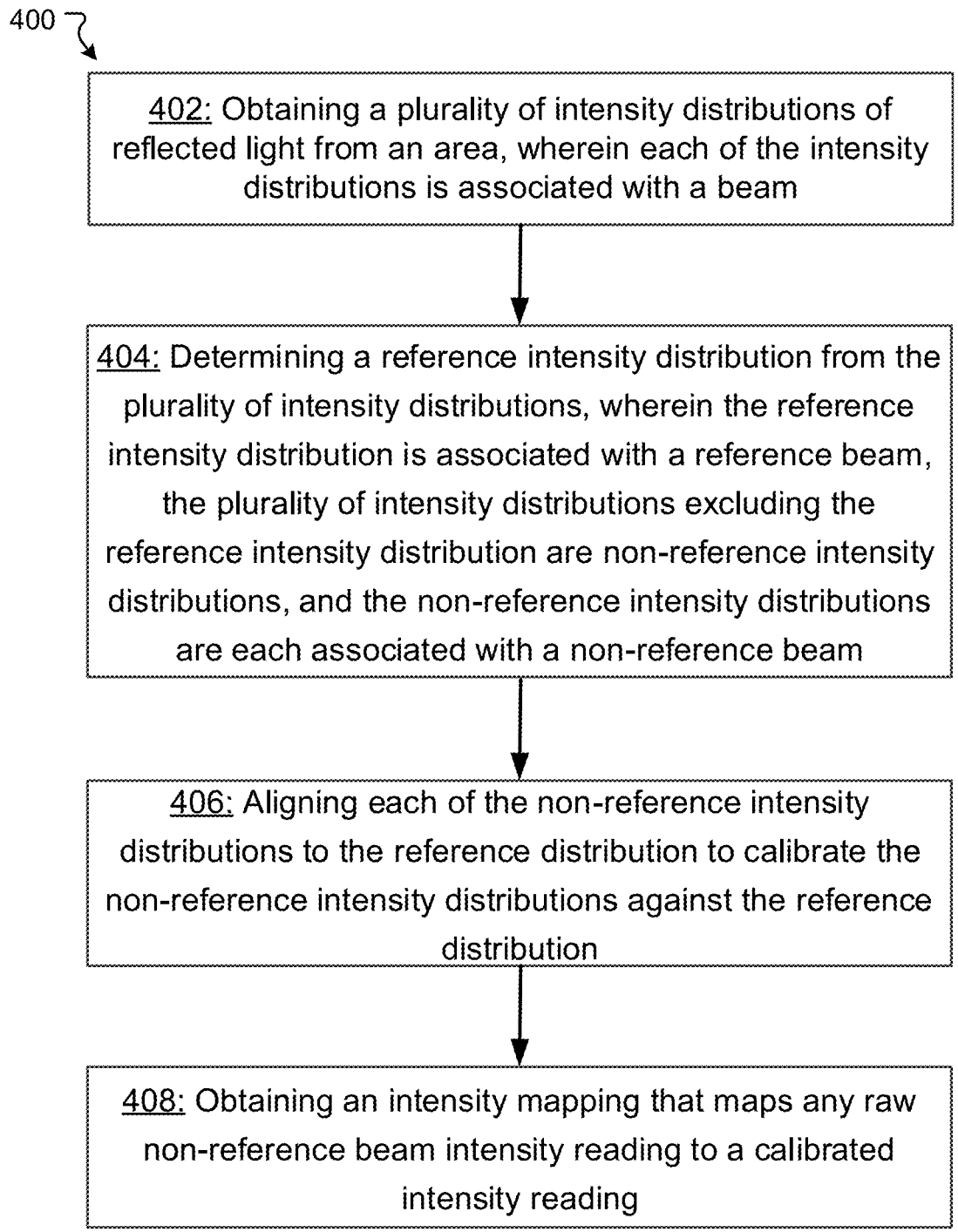
FIG. 4 illustrates a flowchart of an exemplary method for light intensity calibration, in accordance with various embodiments.

FIG. 4 illustrates a flowchart of an exemplary method 400, according to various embodiments of the present disclosure. The method 400 may be implemented in various environments including, for example, the system 100 of FIG. 1 or the system 200 of FIG. 2. The exemplary method 400 may be implemented by one or more components of the system 102 or 103 (e.g., the processor 104, the memory 106). The exemplary method 400 may be implemented by multiple systems similar to the system 102 or 103. The operations of method 400 presented below are intended to be illustrative. Depending on the implementation, the exemplary method 400 may include additional, fewer, or alternative steps performed in various orders or in parallel.

At block 402, a plurality of intensity distributions of reflected light from an area may be obtained, wherein each of the intensity distributions is associated with a beam. At block 404, a reference intensity distribution from the plurality of intensity distributions may be determined, wherein the reference intensity distribution is associated with a reference beam, the plurality of intensity distributions excluding the reference intensity distribution are non-reference intensity distributions, and the non-reference intensity distributions are each associated with a non-reference beam. At block 406, each of the non-reference intensity distributions may be aligned to the reference distribution to calibrate the non-reference intensity distributions against the reference distribution. To align any non-reference intensity distribution to the reference distribution, the non-reference intensity distribution may be recursively aligned to a neighboring non-reference intensity distribution towards the reference intensity distribution until aligned with the reference intensity distribution. At block 408, optionally, an intensity mapping that maps any raw non-reference beam intensity reading to a calibrated intensity reading may be obtained.

In some embodiments, the light beams may be respectively emitted from a plurality of light emitters of a LIDAR device. The LIDAR device may further comprise a plurality of light detectors for respectively receiving the reflected light. In association with the each beam, the each light emitter and associated light detector may be movable relative to the area and configured to obtain an intensity reading at various time points to obtain the corresponding intensity distribution over the area.

In some embodiments, the LIDAR device may be disposed on a vehicle. The each light emitter and associated light detector may be configured to rotate relative to the vehicle as the vehicle moves relative to the area. In association with the each beam, the each intensity distribution over the area may comprise a plurality of the intensity readings caused by the rotation and the vehicle movement.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
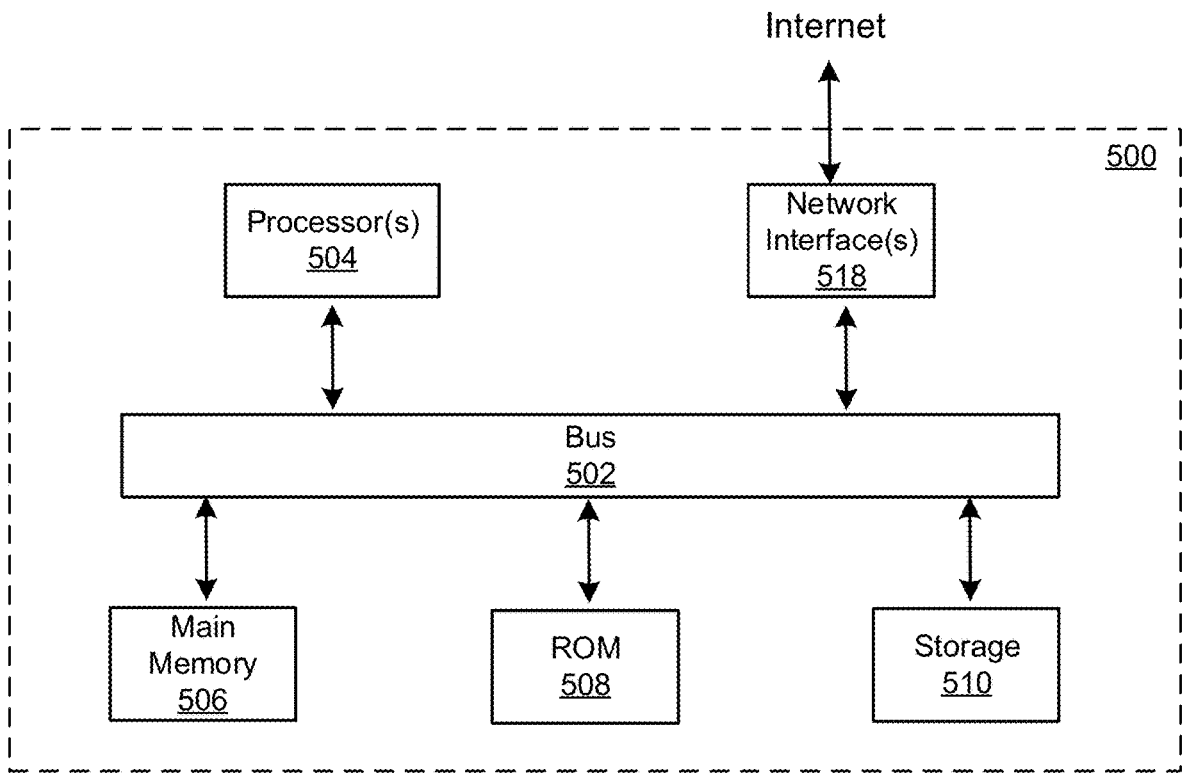
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 or 103 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for light intensity calibration, comprising:
    emitting a plurality of light beams from a plurality of light emitters of a LIDAR (Light Detection And Ranging) device,
    receiving reflected light of the plurality of light beams by a plurality of light detectors of the LIDAR device, wherein the reflected light comprises a reference intensity distribution associated with a reference beam of the plurality of light beams, and one or more non-reference intensity distributions associated with one or more non-reference beams of the plurality of light beams; and
    calibrating the one or more non-reference intensity distributions to the reference intensity distribution.

2. The method of claim 1, wherein calibrating the one or more non-reference intensity distribution to the reference intensity distribution comprises:
    applying a Dynamic Time Warping (DTW) algorithm to align the one or more non-reference intensity distributions to the reference intensity distribution.

3. The method of claim 1, wherein calibrating the one or more non-reference intensity distributions to the reference intensity distribution comprises:
    ordering the light beams based on a physical proximity among intersections of the light beams with an area of the reflected light, wherein the physical proximity among the intersections of the light beams with the area corresponds to another physical proximity among the light emitters of the LIDAR device, wherein the reference beam is in the center of the ordered light beams.

4. The method of claim 1, wherein:
    the plurality of light emitters and the plurality of light detectors are movable relative to an area of the reflected light and configured to obtain an intensity reading at various time points to obtain the corresponding intensity distribution over the area.

5. The method of claim 4, wherein:
    the LIDAR device is disposed on a vehicle;
    the plurality of light emitters and the plurality of light detectors are configured to rotate relative to the vehicle as the vehicle moves relative to the area; and
    the reference intensity distribution and the non-reference intensity distributions comprise a plurality of the intensity readings caused by the rotation and the vehicle movement.

6. The method of claim 1, wherein:
    the reference intensity distribution and the non-reference intensity distributions are representable in histograms associating light intensity readings and frequency of occurrence of the light intensity readings in an area of the reflected light;
    the area comprises a marker corresponding to one or more intensity peaks in one or more histograms of the intensity distributions; and
    the reference intensity distribution is representative of the marker in a background.

7. The method of claim 1, further comprising:
    obtaining an intensity mapping that maps any raw non-reference beam intensity reading to a calibrated intensity reading.

8. A system for light intensity calibration, comprising one or more processors and one or more non-transitory computer-readable memories coupled to the one or more processors and configured with instructions executable by the one or more processors to cause the system to perform operations comprising:
    emitting a plurality of light beams from a plurality of light emitters of a LIDAR (Light Detection And Ranging) device,
    receiving reflected light of the plurality of light beams by a plurality of light detectors of the LIDAR device, wherein the reflected light comprises a reference intensity distribution associated with a reference beam of the plurality of light beams, and one or more non-reference intensity distributions associated with one or more non-reference beams of the plurality of light beams; and
    calibrating the one or more non-reference intensity distribution to the reference intensity distribution.

9. The system of claim 8, wherein calibrating the one or more non-reference intensity distribution to the reference intensity distribution comprises:

applying a Dynamic Time Warping (DTW) algorithm to align the one or more non-reference intensity distributions to the reference intensity distribution.

10. The system of claim 8, wherein the plurality of light emitters and the plurality of light detectors are rotatable light emitters and detectors mountable on a movable vehicle, the each light emitter emitting the each light beam of the plurality of light beams and the each light detector detecting the each corresponding light intensity while in rotation as the vehicle moves relative to the area, wherein calibrating the plurality of non-reference intensity distribution to the reference intensity distribution comprises:
   ordering the plurality of light beams based on a physical proximity among intersections of the beams with an area of the reflected light at the same time; and
   recursively aligning the each non-reference beam to a physically closest beam towards the reference beam until aligning to the reference beam.

11. The system of claim 10, wherein recursively aligning the each non-reference beam to the physically closest beam towards the reference beam comprises:
   aligning closest light beams of the plurality of light beams to the reference beam;
   aligning next closest light beams of the plurality of light beams to the closest light beams;
   repeating the alignments until each of the non-reference beams is aligned to another beam towards the reference beam; and
   propagating the alignments throughout the non-reference beams to align each of the non-reference beams to the reference beam.

12. The system of claim 10, wherein:
   the physical proximity among the intersections of the beams with the area corresponds to another physical proximity among the light emitters on the LIDAR device.

13. The system of claim 8, wherein:
   the plurality of light emitters and the plurality of light detectors are movable relative to an area of the reflected light and configured to obtain an intensity reading at various time points to obtain the corresponding intensity distribution over the area.

14. The system of claim 13, wherein:
   the LIDAR device is disposed on a vehicle;
   the plurality of light emitters and the plurality of light detectors are configured to rotate relative to the vehicle as the vehicle moves relative to the area; and
   the reference intensity distribution and the non-reference intensity distributions comprise a plurality of the intensity readings caused by the rotation and the vehicle movement.

15. The system of claim 8, wherein:
   the reference intensity distribution and the non-reference intensity distributions are representable in histograms associating light intensity readings and frequency of occurrence of the light intensity readings in an area of the reflected light;
   the area comprises a marker corresponding to one or more intensity peaks in one or more histograms of the intensity distributions; and
   the reference intensity distribution is representative of the marker in a background.

16. The system of claim 8, wherein the processor is further configured to:
   obtain an intensity mapping that maps any raw non-reference beam intensity reading to a calibrated intensity reading.

17. A non-transitory computer-readable storage medium coupled to a processor and comprising instructions that, when executed by the processor, cause the processor to perform a method for light intensity calibration, the method comprising:
   emitting a plurality of light beams from a plurality of light emitters of a LIDAR (Light Detection And Ranging) device;
   receiving reflected light of the plurality of light beams by a plurality of light detectors of the LIDAR device, wherein the reflected light comprises a reference intensity distribution associated with a reference beam of the plurality of light beams, and one or more non-reference intensity distributions associated with one or more non-reference beams of the plurality of light beams; and
   calibrating the one or more non-reference intensity distribution to the reference intensity distribution.

18. The non-transitory computer-readable storage medium of claim 17, wherein calibrating the one or more non-reference intensity distribution to the reference intensity distribution comprises:
   applying a Dynamic Time Warping (DTW) algorithm to align each of the non-reference intensity distributions to the reference intensity distribution.

19. A system for light intensity calibration, implementable on a LIDAR (Light Detection And Ranging) device, the system comprising:
   a plurality of rotatable light emitters and detectors mountable on a movable vehicle, the each light emitter emitting a beam and the each light detector detecting an reflection of the corresponding beam while in rotation as the vehicle moves relative to an area; and
   a processor coupled to the detectors and configured to:
      obtain a plurality of intensity distributions of the reflected light from the area;
      determine a reference intensity distribution from the plurality of intensity distributions, wherein the reference intensity distribution is associated with a reference beam, the plurality of intensity distributions excluding the reference intensity distribution are one or more non-reference intensity distributions, and the one or more non-reference intensity distributions are associated with one or more non-reference beams; and
   align the one or more non-reference intensity distributions to the reference intensity distribution to calibrate the one or more non-reference intensity distributions against the reference intensity distribution.

20. The system of claim 19, wherein:
   to align the one or more non-reference intensity distribution to the reference intensity distribution, the processor is configured to recursively align the one or more non-reference intensity distribution to a neighboring non-reference intensity distribution towards the reference intensity distribution until aligned with the reference intensity distribution.

* * * * *